United States Patent [19]

Birkestrand

[11] 4,072,073
[45] Feb. 7, 1978

[54] MACHINE FOR CUTTING PIPE AND TUBING

[76] Inventor: Orville J. Birkestrand, 129A Casuda Canyon Drive, Monterey Park, Calif. 91754

[21] Appl. No.: 675,200

[22] Filed: Apr. 8, 1976

[51] Int. Cl.$^2$ .............................................. B23B 5/14
[52] U.S. Cl. ................................. 82/92; 83/411 R; 82/101; 82/70.1
[58] Field of Search ................... 82/92, 70.1, 101; 30/102; 83/411 R

[56] References Cited

U.S. PATENT DOCUMENTS

| | | | |
|---|---|---|---|
| 794,389 | 7/1905 | Boax | 82/101 |
| 1,765,208 | 6/1930 | Cunningham | 82/92 |
| 1,922,426 | 8/1933 | Fahrney | 82/92 |
| 2,481,446 | 9/1949 | Quijada | 82/92 |
| 3,159,071 | 12/1964 | Bateman | 83/411 R |

FOREIGN PATENT DOCUMENTS 344,029  1/1958  Switzerland .......................... 82/70.1

Primary Examiner—Donald R. Schran
Attorney, Agent, or Firm—William T. O'Neil

[57] ABSTRACT

A pipe cutting machine having a pair of driven rollers and a free wheeling cutter wheel with novel means for advancing the cutter radially into the work. A single column with rack and key adjustment arrangement accommodates different pipe diameters rapidly. The cutter advancing hand lever operates with an eccentric for large mechanical advantage. Unique hole, keyway and split-ring clamping means are included for properly aligning the cutter wheel axis parallel to the drive roller axes at any predetermined column height. The rollers are both driven from an all spur (or parallel shaft helical) gear arrangement and are supported fron a cantilevered spindle and bearing arrangement.

6 Claims, 6 Drawing Figures

MACHINE FOR CUTTING PIPE AND TUBING

BACKGROUND OF THE INVENTION

1. Field of The Invention

The invention applies to the field of pipe and tubing cutting machinery generally, and more particularly, to such machines of the type in which the work and a knife-edge cutting wheel rotate.

2. Description of The Prior Art

In the prior art, machinery for cutting pipe and tubing is extant in various forms. Some of these include powered metal saws of the reciprocating or rotating circular types. Others employ rotating abrasive wheel cutters. The class of prior art devices most closely related to the device of the present invention concerns those in which a roller arrangement forms a cradle for the work and rotational drive is applied thereto, a cutter wheel being advanced against the work generally radially oppositely with respect to the rollers.

There exists a continuing effort in the industry to provide machinery of the present type with the greatest possible flexibility, speed and convenience of operation, and affording long life and ease of repair and maintenance. Economy of manufacture of the machine itself is also a matter of importance.

The manner in which the present invention advances and improves this art will be understood as this description proceeds.

SUMMARY OF THE INVENTION

It may be said to have been the general objective of the present invention to provide an economically constructed pipe and tubing cutting machine which provides manufacturing economies through reduction of changeover time and effort for different work sizes, and minimization of repair and maintenance down-time, along with increased production efficiency.

The device generally includes a pair of driven rollers (usually horizontal) rotating in the same direction on parallel axes against which the work nests thereby providing work contact along two lines, one on each roller surface. A gear reduction factor and fully enclosed gearing arrangement is afforded in a unique manner for improved efficiency and strength.

A cutter head assembly is slideably mounted on a single (generally vertical) column. The column includes a rack against which a pinion gear operates to provide vertical positioning of the cutter head. Column positioning, once satisfactorily achieved, is preserved for a given size work by tightening the cutter assembly housing against the column in accordance with a unique arrangement.

The details of implementation of the foregoing features, as well as other novel features, will be understood as this description proceeds.

DESCRIPTION OF THE PREFERRED EMBODIMENT

Figure 1:
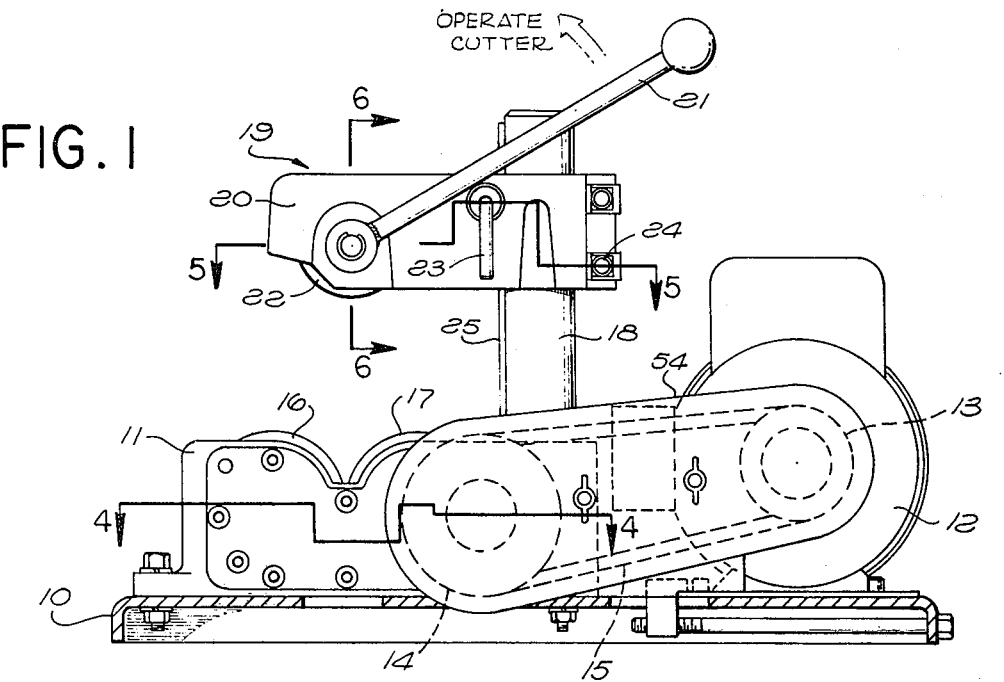
FIG. 1 is a partially sectioned side view of a pipe and tubing cutter according to the invention.
Figure 2:
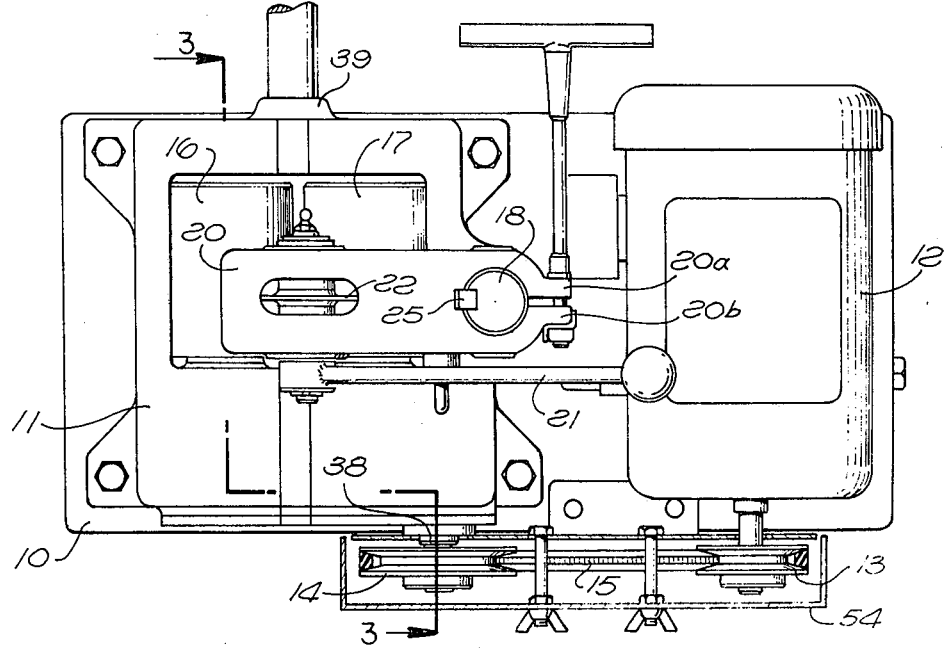
FIG. 2 is a top view of the device of FIG. 1.

Referring now to FIGS. 1 and 2, a typical device according to the invention is illustrated. Although these side and top views represent the typical (and much preferred) physical orientation of the device, it should be pointed out that a practice of the invention in special circumstances would be possible if FIG. 1 were the top view and FIG. 2 the side view, although special work support would be required. The description hereinafter assumes, however, that FIG. 2 is the top view and FIG. 1 is the side view, since this orientation is the normal one.

In FIG. 1, the drive motor 12, the roller assembly support casting 11, and the cutter head support column 18 are supported from a base 10. A cutter head assembly 19 is supported from 18 above the roller assembly, the latter including the casting 11 and rollers 16 and 17 visible in FIGS. 1 and 2. The base 10, support 11 and cutter head enclosure and member 20 are assumed to be appropriately machined castings as is common in devices of the type, however, those skilled in this art will realize that other fabrication processes could be employed, alternatively.

A belt drive comprising pulleys 13 and 14 and belt 15 is protected by a shield cover or belt guard 54, mounted, for example, as shown. This belt drive transmits power from motor 12 to a roller drive pulley shaft 38, the gearing thereafter relating to rollers 16 and 17 being hereinafter described.

The cutter head support vertical column 18 is key grooved axially and a gear-tooth rack 25 is inserted as a key therein. This key-rack is firmly pinned or screwed to 18. A pinion gear operated by handle 23 engages 25 for raising and lowering the entire 19 assembly to change work size. The details of this adjustment will be explained hereinafter.

If it is assumed that a pipe or tube to be cut is laid onto the rollers 16 and 17, so as to be nested therebetween in a position parallel to guide bar 40 (FIG. 2), the handle 21 may be operated to cause, through cam arrangement, the cutter wheel 22 to engage and cut into the work as the lever 21 is advanced. The fully withdrawn cutter-to-work clearance need only be sufficient for easy work insertion and removal.

During the cutting operation rollers 16 and 17 are rotating, causing the pipe or tubing (work) to rotate. In turn, the cutter wheel 22 rotates, free-wheeling about its shaft, as it cuts into the work.

The casting 20 which houses and supports the cutter head working parts has an opening which accommodates shaft 18 with slip-fit ease for operation of the rack and pinion vertical cutter head positioning function, until the lock bolts (typically 24) are tightened. This tightening tends to draw the split housing ends 20a and 20b together locking the head 19 firmly in place. The casting 20 will be seen to grip the column 18 throughout the full vertical dimension of casting 20 engaging 18, and accordingly, the locked position of 19 is very rigidly held. A cutter head lock handle 37 may be simply a Tee wrench for tightening the bolts (typically 24) or may be an integral bolt head device, in which case the two lock bolts 24 illustrated might be tightened from alternate sides of the 20a/20b location (see especially FIG. 2).

An optional outrigger support for cutting long lengths of pipe or tubing is provided by outrigger assembly guide bar 39 which may be affixed to the roller support casting 11 by threaded engagement in a boss 39. The guide wheels 42 and 43 are free to rotate about their respective shafts as supported by support yoke 41. The wheels 42 and 43 serve only to prevent binding of long lengths of pipe or tubing, and as such are not required to be as rigidly supported as are other parts of the machine.

Figure 4:
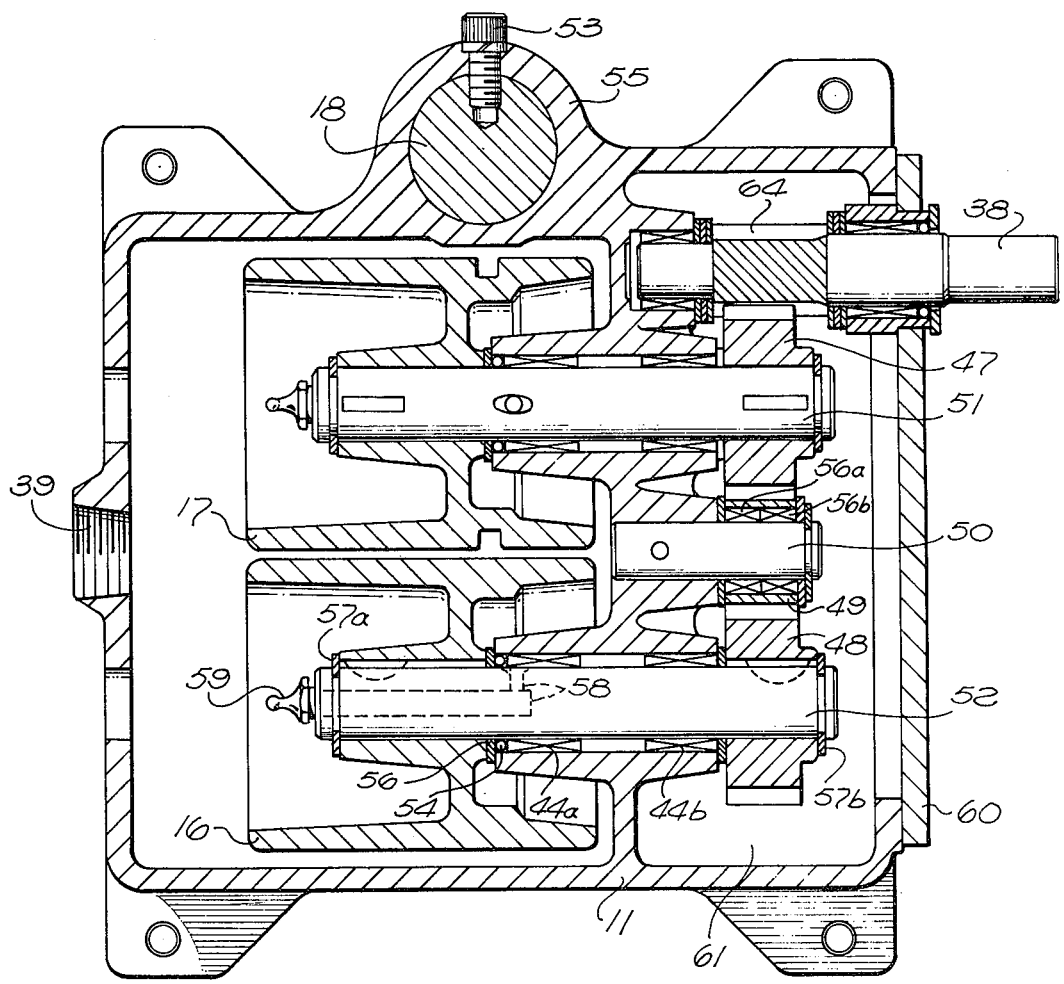
FIG. 4 is a sectional view taken through the roller drive assembly taken as indicated on FIG. 1.
Figure 3:
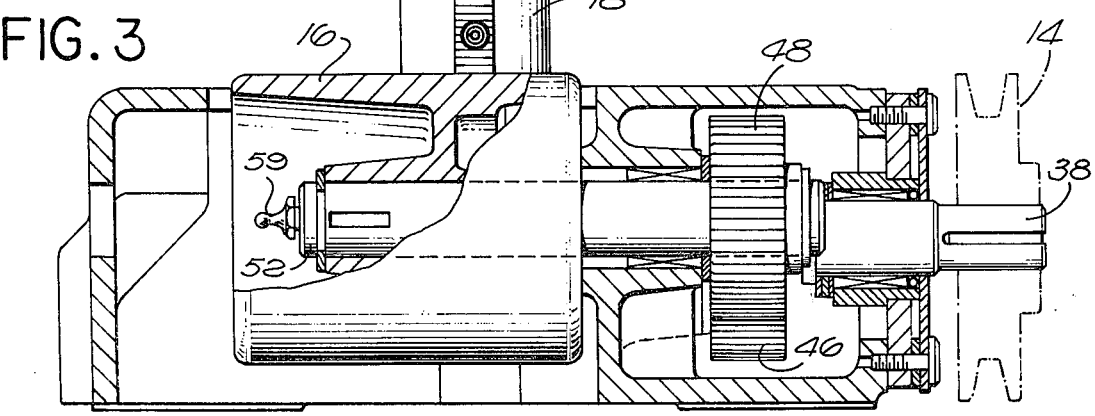
FIG. 3 is a section view taken through the roller drive assembly as indicated on FIG. 2.

Referring now to FIGS. 3 and 4, the internal construction of the roller drive within 11 may be seen. One of the particular advances afforded by the combination of the present invention is the cantilevered roller mountings. Roller 16, on shaft 52, is held in alignment by two needle bearings 44a and 44b, the latter contained in a bore in a central portion of the casting 11 as well depicted in FIG. 4. An "O" ring 45 and thrust race 56 provide for easy dismounting of rollers and replacement without encountering difficult alignment problems. Dismounting of 16 (over 59) for example, requires removal of retainer rings 57a and 57b. Lubrication bores 58 are illustrated as providing lubricant to needle bearing 44a from application at 59, however, these bores 58 obviously could be extended to lubricate 44b in the same manner. It should be noted however, that the chamber 61 contains lubricating oil which lubricates the gears by splash effect and also lubricates 44b. The "O" rings applied are nominally compressed in accordance with assembly tolerances such that they act as low-cost seals.

A spur (or helical) gear 48 is keyed to shaft 52, and in the same way a gear 47 is keyed to shaft 51 of roller 17. The same bearing arrangement is shown for shaft 51 as for 52.

The rollers 16 and 17 are normally relatively smooth, to avoid marking the work and are manufactured with relatively hard surfaces produced either by selection of material, heat treating, or both. The easy replacement of these rollers, which, like the cutter wheel, are more wear-prone than other parts of the machine, is thus an ancillary advantage. Removal of access plate 60 facilitates gear removal and replacement.

It will be seen that a double needle bearing arrangement, 56a and 56b provides rigid support for idler gear 49 mounted on shaft 50, the latter pinned into a bore within the central section of casting 11. This gear 49, as well as gears 47 and 48, can be removed by removing retainer rings as shown.

Removal of access plate 60 automatically removes the drive pinion gear 46 mounted on shaft 38 (which shaft mounts the pulley 14). A retainer ring, bushing and bearing will be seen to hold shaft 38 with rotational freedom through 60.

The roller drive casting 11 has a support section 55 with a bore which firmly mounts column 18, locked therein by means such as a cap screw 53. It will be seen from FIG. 1 that this casting 11 has a vertical dimension long enough to provide very rigid support for column 18.

Threaded casting socket 39 (FIG. 4) accommodates 40 as discussed in connection with FIG. 2.

Figure 5:
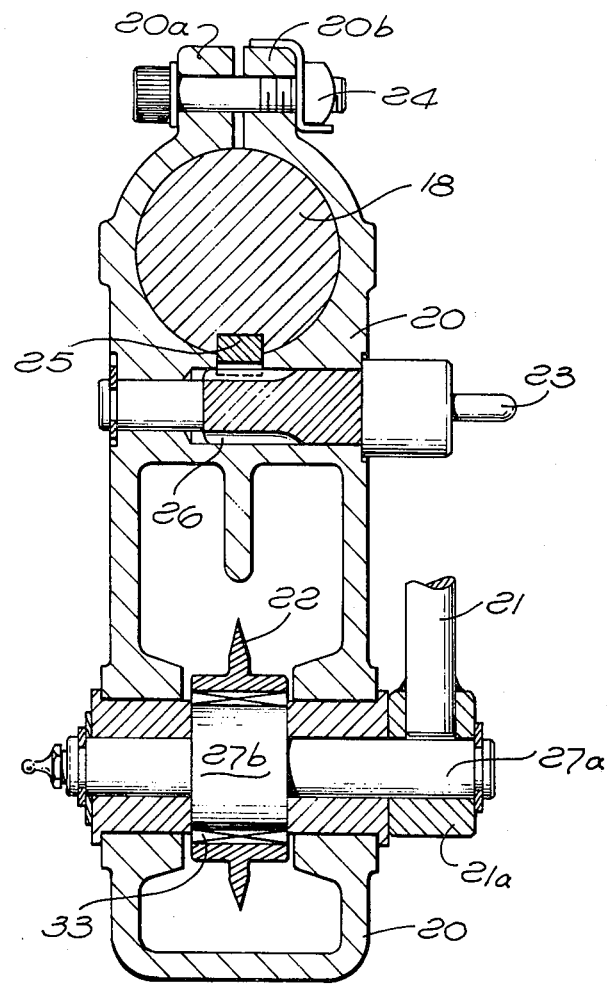
FIG. 5 is a sectional view of the cutter head assembly taken as indicated on FIG. 1.

Referring now to FIG. 5, a cross-section through cutter head 19 shows column 18 gripped by the bolt means 24 at 20a and 20b, as aforementioned. The vertical positioning arrangement for 19 as aforementioned includes pinion handle 23 which rotates pinion gear 26, the latter engaging rack-key 25.

Figure 6:
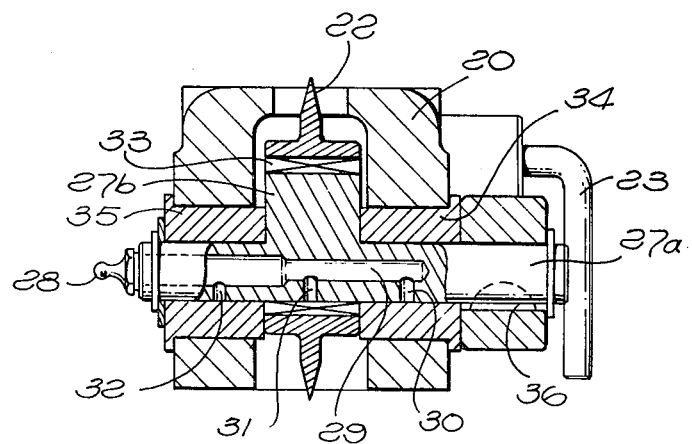
FIG. 6 is a sectional view through the cutter head assembly taken as indicated on FIG. 1.

Referring also to FIG. 6, the integral shaft-eccentric 27a and 27b is mounted through a pair of bushings 34 and 35, the latter in bores through the walls of 20.

The cutter feed lever assembly 21 has a collar portion 21a which is keyed to shaft 27a, so that operation of 21 causes the eccentric 27b to rotate. This lowers the cutter wheel into work contact. The eccentric section 27b is of course of uniformly circular outer cross-section where it carries needle bearing 33. The cutter wheel 22 is thereby free to rotate about the eccentric in response to rotation imparted to it by the work.

A lubrication fitting 28 with bores 30, 31 and 32 provides lubrication to bearings and other metal-to-metal rotational interfaces in the same manner as in connection with 59, etc. Other lubrication fittings and ducts need not be described, since their nature and function will be entirely clear from the foregoing and from the drawings. Bushings 34 and 35 would be of bearing grade material, as they are subject to substantial lateral forces from cutter-to-work interaction. It will be noted that the bores in 20 are large enough to provide for clearance of eccentric 27b to facilitate its removal after bushings 34 and 35 are removed.

Those skilled in this art will be able to select suitable materials for construction of the device. In general, non-ferrous castings (aluminum-light weight for portability) would be used for base 10 and for 11 and 20. Shafts and bushings would preferably be of hardened steel, and the cutter wheel itself is of specially hardened steel. The lever assembly 21 can be replaced by an air driven feed or by an electric feed mounted on the support casting such that it rides up and down with the cutter assembly during work size adjustment.

The cutter wheel need not be other than as commercially available, its construction not being a novel part of the present combination.

Obviously, a gas engine or other drive means may replace the motor shown. The motor placement and mounting accommodates an easy conversion in this respect.

Modifications and variations of the details of the device described will suggest themselves to those skilled in this art. Accordingly, it is not intended that the scope of the invention be limited by the drawings and this description which are typical and illustrative only.

What is claimed is:

1. A machine for cutting pipe, tubing and the like, comprising:

a base member and motive power means mounted thereon;

a pair of generally parallel, driven rollers rotatably mounted from said base member;

a mechanical drive arrangement mounted on said base member for coupling said motive power means to said rollers to cause said rollers to rotate synchronously in opposite rotational senses;

a cutter-head assembly including a free-wheeling cutter wheel rotatable about a shaft within said head assembly and substantially parallel to said rollers, and first means including an eccentric drive and connected hand lever for advancing said cutter against and through the work, said work, cutter and rollers all rotating when said cutter is in work contact;

and second means independent of said first means and mounted from said base member for selectively and rigidly pre-positioning said cutter-head assembly as a unit with respect to said work to provide an initial cutter position appropriate for a particular diameter of work, the range of cutter advancement required of said first means being thereby limited, said second means comprising a gear-toothed rack structurally fixed with respect to said base, and a pinion gear rotatably mounted about a shaft attached to said head assembly and associated with a second hand lever to effect said pre-positioning of said cutter-head assembly by rotation of said second lever.

2. Apparatus according to claim 1 further including a locking mechanism operable to lock said cutter-head assembly in the pre-position set through said second means, said locking mechanism being independent of said first means.

3. In a pipe and tubing cutting machine including a pair of driven rollers against which the work is nested to produce rotation thereof, and in which a cutter-head assembly is arranged to advance a free-wheeling cutter wheel against said work, the combination comprising:

a base member for mounting motive power means and a mechanical drive arrangement for providing reduced-speed rotation of said rollers in counter-rotational relationship;

and means for rotational mounting of said rollers comprising a pair of generally parallel corresponding roller shafts, each of said shafts being rotationally emplaced adjacent one end thereof within said base member by means of at least one bearing corresponding to each of said shafts and having an axially extended shaft contact area, said bearing being located along a central portion of said shafts thereby providing cantilevered shaft ends for mounting said rollers, the other ends of said shafts coupling to said mechanical drive arrangement.

4. Apparatus according to claim 3 in which said bearings along said central portions of said roller shafts comprise two spaced bearings within said central portion of each of said roller shafts, said bearings for each shaft being emplaced in the same bore within said base member, thereby increasing the rigidity of said cantilevered rollers and also avoiding the bearing and shaft alignment problems inherent in shaft end support bearing arrangements.

5. Apparatus according to claim 4 in which said roller shaft bearings are of the needle bearing type.

6. Apparatus according to claim 3 in which said mechanical drive arrangement comprises an arrangement of meshed spur gears, one gear on the one end of the shaft of each of said rollers, one idler gear therebetween, and a drive input gear with shaft engaging one of said roller gears, said drive input gear shaft being connected to said motive power means by a belt and pulley arrangement, said motive means being thereby easily changed without disturbing said gears, said gears being on the ends of said roller shaft opposite said cantilevered roller mountings.

* * * * *